United States Patent
MacDowell

(10) Patent No.: US 7,318,442 B2
(45) Date of Patent: Jan. 15, 2008

(54) AUTOMATIC CAR WASH SYSTEM

(76) Inventor: Michael MacDowell, 1230 7th St., NW., Hickory, NC (US) 28601

( * ) Notice: Subject to any disclaimer, the term of this patent is extended or adjusted under 35 U.S.C. 154(b) by 661 days.

(21) Appl. No.: 10/824,050

(22) Filed: Apr. 14, 2004

(65) Prior Publication Data

US 2005/0229808 A1    Oct. 20, 2005

(51) Int. Cl.
| | |
|---|---|
| B08B 3/00 | (2006.01) |
| B08B 3/04 | (2006.01) |
| B08B 3/12 | (2006.01) |
| B08B 6/00 | (2006.01) |
| B05B 1/14 | (2006.01) |
| B05B 1/20 | (2006.01) |
| B05B 3/00 | (2006.01) |
| B05B 3/18 | (2006.01) |

(52) U.S. Cl. ............ 134/123; 134/57 R; 134/113; 134/123; 134/132; 134/198; 134/201; 239/550; 239/565; 239/566; 239/750; 239/751; 239/752; 239/753

(58) Field of Classification Search ........... 134/123, 134/132, 201, 57 R, 113, 198
See application file for complete search history.

(56) References Cited

U.S. PATENT DOCUMENTS

| | | | |
|---|---|---|---|
| 3,596,241 A | | 7/1971 | Migneault |
| 3,809,919 A | * | 5/1974 | Aaron .......... 307/41 |
| 3,997,868 A | * | 12/1976 | Ribnick et al. ........ 340/902 |
| RE33,849 E | | 3/1992 | Detrick |
| 5,255,695 A | | 10/1993 | Downey |
| 5,432,974 A | * | 7/1995 | Yasutake et al. ......... 15/316.1 |
| 5,447,574 A | * | 9/1995 | Inoue .............. 134/18 |
| 5,901,398 A | | 5/1999 | Ishikawa et al. |
| 6,147,625 A | | 11/2000 | Decker |
| 6,551,415 B2 | * | 4/2003 | Jones et al. ........... 134/18 |
| 6,561,202 B1 | | 5/2003 | Amadio |
| 2002/0144366 A1 | | 10/2002 | Ikari |
| 2002/0162581 A1 | | 11/2002 | Heinze et al. |
| 2003/0047201 A1 | | 3/2003 | Kaipainen |
| 2003/0086574 A1 | * | 5/2003 | Higgs ............ 381/77 |

OTHER PUBLICATIONS www.carwash.com; Apr. 2003.
www.moderncarcare.com; Jul. 2000.
www.rebroadcastFM.com; Date unknown.
www.vinland.com; Date unknown.
www.inc.com/businessinsights; Apr. 2004.
www.carwash.com; Mar. 2004.
www.baneng.com; Date unknown.
JSW Concepts: Home, 4 pages; available at www.jswconcepts.com.

(Continued)

Primary Examiner—Michael Barr
Assistant Examiner—Rita R Patel
(74) Attorney, Agent, or Firm—Alston & Bird LLP

(57) ABSTRACT

An automatic car wash system is provided for processing multiple vehicles simultaneously. The system according to one embodiment includes an elongate path, a plurality of stations for processing the vehicle, at least two detectors for indicating the presence of the vehicles. The system provides instructions to the drivers of the vehicles so that the vehicles travel through the system under their own power, and thus conveyor systems can be avoided, yet throughput remains high. In one embodiment, the system includes a radio transmitter that is operable to direct specific information to each of the vehicles via radio signals.

29 Claims, 4 Drawing Sheets

OTHER PUBLICATIONS

JSW Concepts: Portable Broadcasters, 10 pages; available at www.jswconcepts.com.

JSW Concepts: Broadcast Audio Services, 16 pages; available at www.jswconcepts.com.

JSW Concepts: Radio House Tour, 4 pages; available at www.jswconcepts.com.

JSW Concepts: Additional Services, 3 pages; available at www.jswconcepts.com.

JSW Concepts: Success Stories, 29 pages; available at www.jswconcepts.com.

JSW Concepts: Online Ordering, 7 pages; available at www.jswconcepts.com.

Manistee Auto Spa, LLC: Home Page; 13 pages; available at www.manisteeautospa.com.

Manistee Auto Spa, LLC: Spa Radio; 14 pages; available at www.manisteeautospa.com.

Manistee Auto Spa, LLC: Trade Magazine Articles; 16 pages; available at www.manisteeautospa.com.

Manistee Auto Spa, LLC: Auto Spa Store; 3 pages; available at www.mainisteeautospa.com.

Manistee Auto Spa, LLC: Coupons; 2 pages; available at www.manisteeautospa.com.

Manistee Auto Spa, LLC: Vending; 3 pages; available at www.manisteeautospa.com.

Manistee Auto Spa, LLC: Miss Bug; 2 pages; available at www.manisteeautospa.com.

Manistee Auto Spa, LLC: Client Corner; 3 pages; available at www.manisteeautospa.com.

Manistee Auto Spa, LLC: Fundraisers; 6 pages; available at www.manisteeautospa.com.

Manistee Auto Spa, LLC: Video; 2 pages; available at www.manisteeautospa.com.

Manistee Auto Spa, LLC: Fleet Accounts; 6 pages; available at www.manisteeautospa.com.

Manistee Auto Spa, LLC: Gift Ideas; 2 pages; available at www.manisteeautospa.com.

Manistee Auto Spa, LLC: Suppliers; 5 pages; available at www.manisteeautospa.com.

* cited by examiner

AUTOMATIC CAR WASH SYSTEM

BACKGROUND OF THE INVENTION

The present invention relates to automatic car wash systems, and more particularly to automatic car wash systems that are able to process more than one vehicle at a time.

Automated car washes account for a significant portion of the car wash industry. Automated car washes can be typically grouped into two primary systems that control throughput; namely, conveyor or "tunnel" systems and rollover or "in-bay" systems. Conveyor systems can be broken down further into two types: attended and unattended. Attended conveyors can be broken down further into three types: full-service, exterior-only and flex-serve.

One type of attended conveyor system is the full-service conveyor car wash, which includes one or more attendants who greet the patrons at the entrance to the car wash and directs them into a waiting room while the attendants drive the vehicles onto the conveyor of the car wash. One or more other attendants are present at the exit end of the car wash and drive the vehicles off the conveyor to a drying area, where the vehicles are hand dried and prepared for the patrons.

The second attended type is the exterior-only conveyor. Exterior-only, like full-service, has one or more attendants at the entrance. Exterior-only differs from full-service in that the customer remains in the car and is directed by the attendant as to how and when to engage the conveyor system. There are also variations upon the full-service and exterior-only systems, such as flex-serve systems, that can sometimes blur the lines of division, but all are attendant dependant.

The third type of conveyor system is the unattended conveyor car wash, which utilizes visual and audible instructions to assist the driver in positioning the vehicle on the conveyor. The driver stays in the vehicle during the wash process, and must place the transmission of the vehicle in neutral so that the conveyor can move the vehicle through the car wash. Unattended conveyor car wash systems are disclosed by U.S. Pat. Nos. 5,432,974 and 5,901,398, both of which are incorporated herein by reference.

Attended conveyor car washes have several disadvantages. The main problem associated with the full-service, exterior-only or flex-serve conveyors are their dependence upon attendants to load vehicles onto the conveyor. Labor and the associated costs make attended conveyors more expensive operationally. In addition, most conveyor systems limit the hours of operation as the expense of attendants makes evening, night, and early morning operation unprofitable due to limited demand. Attended conveyor systems often close or ask attendants to take the day off when there is questionable weather to minimize labor expenses. If the weather is misinterpreted or changes from bad to good and demand becomes present, these conveyor locations miss out on revenues and providing customer satisfaction.

Unattended conveyor car washes also have disadvantages. The customer/driver must negotiate onto the conveyor via traditional driving methods of acceleration, steering, and braking, but then suddenly abandon those tendencies by placing their vehicle in neutral and allowing the conveyor to move their vehicle while avoiding the temptation to control the situation by steering, braking, or the like, thus resisting the realization that they have lost control. In another example, if a driver ignores or does not understand the positioning instructions, the driver may attempt to drive the car over the conveyor, which may possibly damage the vehicle or the car wash. Other cars being washed may also be affected, as the wash process must be stopped until the offending car can be removed.

Rollover or "in-bay" car washes are almost always unattended and utilize similar entry systems to the unattended conveyor car wash system. Typically, rollover car washes are much slower in throughput due to the fact that only one vehicle can be washed at a time. Some rollover car washes include instructional lights, signage, and audible tones to assist the driver in positioning the car within the car wash. Several patents relate to this aspect of the car wash, such as U.S. Pat. No. 3,596,241, which is incorporated herein by reference. The car wash typically includes a wheel detector that the vehicle must engage or drive upon in order to activate the main wash process. Once the vehicle has been washed, more instructional lights, signage, and perhaps audible tones direct the driver to exit the car wash. After the first vehicle has exited the car wash, the next vehicle in line is directed into the car wash for processing. Washing mechanisms and devices are described by a number of U.S. patents, such as U.S. Pat. Nos. 5,255,695 and 5,447,574, which are incorporated herein by reference. While most conventional rollover car washes provide a gantry for a vehicle to drive under that also houses the washing and drying equipment, there are alternative arrangements. One such alternative is described in published patent application, U.S. 2002/0144366A1, which describes a car washing machine that comprises two moving gantries that travel back and forth over a stationary vehicle to wash and dry the vehicle.

Unfortunately, rollover car washes also suffer from some of the same disadvantages as conveyor car washes in that a driver who becomes confused may inadvertently drive past the wheel stop or photo eye sensors in the rollover car wash, which delays the wash process and may damage the vehicle and/or the car wash. There is a need to provide a car wash system that improves the throughput of the vehicles without sacrificing wash quality. There is also a need to improve the transmission of information to a driver so the driver can position and maneuver the vehicle through the car wash system.

BRIEF SUMMARY OF THE INVENTION

These and other needs are met by the automatic car wash system of the present invention. The system is designed to process multiple vehicles simultaneously while the vehicles travel through the system under their own power. The system transmits information to the drivers of the vehicles in a number of ways, such as via radio signals that can be received by the vehicles' radios. In addition, the system detects the location of the vehicles using one or more detectors, such as photo eyes. Further, the system may include one or more proximity devices for determining the relative distance between the vehicles and transmitting information to the vehicles accordingly. As such, the system of the present invention achieves high throughput of vehicles utilizing the vehicles' own power and avoids the disadvantages of conveyor systems.

More particularly, an automatic car wash system according to one embodiment of the present invention includes an elongate path extending at least 20 feet, and a plurality of stations spaced along the elongate path. At least one of the stations includes a spray assembly capable of directing pressurized or high velocity fluid, such as a washing fluid or heated air. Other stations may also be included, such as a wheel washing station, a rotating brush, a wax applicator, a drying station, and a rinsing device. A control device is operatively connected to the stations. The control device may be in the form of a computer capable of processing information relating to vehicles traveling along the elongate path and outputting predetermined responses accordingly. The system also includes at least two detectors that are spaced along the elongate path that are designed to detect and indicate the presence of at least one of the vehicles to the control device. In one embodiment, at least one of the detectors is a conventional wheel detector that is known in the art and is designed to engage or detect a tire of a vehicle, such as by magnetic, photo eye, ultrasonic, or mechanical sensors or means. The system also includes at least one proximity device, which detects the relative distance between the vehicles.

Advantageously, the system also includes a transmitter, such as a radio transmitter, that is operatively connected to the control device. The radio transmitter is capable of transmitting information, such as driving instructions designed to control the movement of a vehicle, advertisements, offers, incentives, entertainment, news, music, and combinations thereof. Other types of transmitters may also be included, such as visual and audible communicators. In one embodiment, the control device is capable of assigning a unique radio frequency to each of the vehicles and directing specific information to each vehicle via the radio transmitter. As such, the driver of a particular vehicle can receive instructions or other information while the vehicle is being washed. Alternatively, multiple radio transmitters may be provided that are spaced along the elongate path that operate on a common frequency and transmit information over a short distance, such as no more than 10 feet, and the control device directs specific information to each radio transmitter. As such, the radio of each vehicle may be set on the same frequency, but individualized information can be directed to a particular vehicle depending on the location of the vehicle along the path of travel.

Methods of processing a plurality of vehicles through an automatic car wash are also provided by the present invention. In one embodiment, the method includes directing a first vehicle to travel into the entrance of the car wash to a first station under the vehicle's own power. The first vehicle is then directed to stop at the first station, such that a washing process or the like can be carried out. The first vehicle is then directed to move under its own power to a second station, and a second vehicle is directed into the entrance of the car wash under its own power before the first vehicle has traveled past the exit of the car wash. As such, multiple vehicles are processed concurrently by the automatic car wash, yet each car travels through the automatic car wash under its own power. In addition, information can be directed to each of the vehicles via radio transmissions or signals in order to help control the movement of the vehicles through the automatic car wash. The vehicles may also be directed into the automatic car wash from a multiple channel entrance having at least two feed channels that combine into a common entrance channel. As such, multiple lines of vehicles may be formed, which enables the drivers in each line to enter information into automatic car wash entry system and therefore increase the rate at which vehicles can enter the car wash.

Advantageously, the systems and methods of the present invention allow for two, three, four, or more vehicles to be processed concurrently, whereby all of the vehicles travel along the path of travel under their own power and are directed to each station via visual or audible signals, such as by radio transmission, lights, or other audible or visual sources. By monitoring the relative distance between the vehicles and sending information to the vehicles in order to effect a desired spacing therebetween, the throughput of the system can be controlled and efficiency maximized. In at least one embodiment, the systems and methods of the present invention do not include any conveyor mechanisms for moving the vehicles along the path of travel, but rather include detectors and other devices for directing the vehicles through the car wash under their own power. As such, the expense, deficiencies, and difficulties of conveyor type automatic car wash systems are eliminated, yet throughput and quality are not compromised and can even be improved while being offered twenty-four hours a day, seven days a week.

BRIEF DESCRIPTION OF THE SEVERAL VIEWS OF THE DRAWINGS

Figure 1:
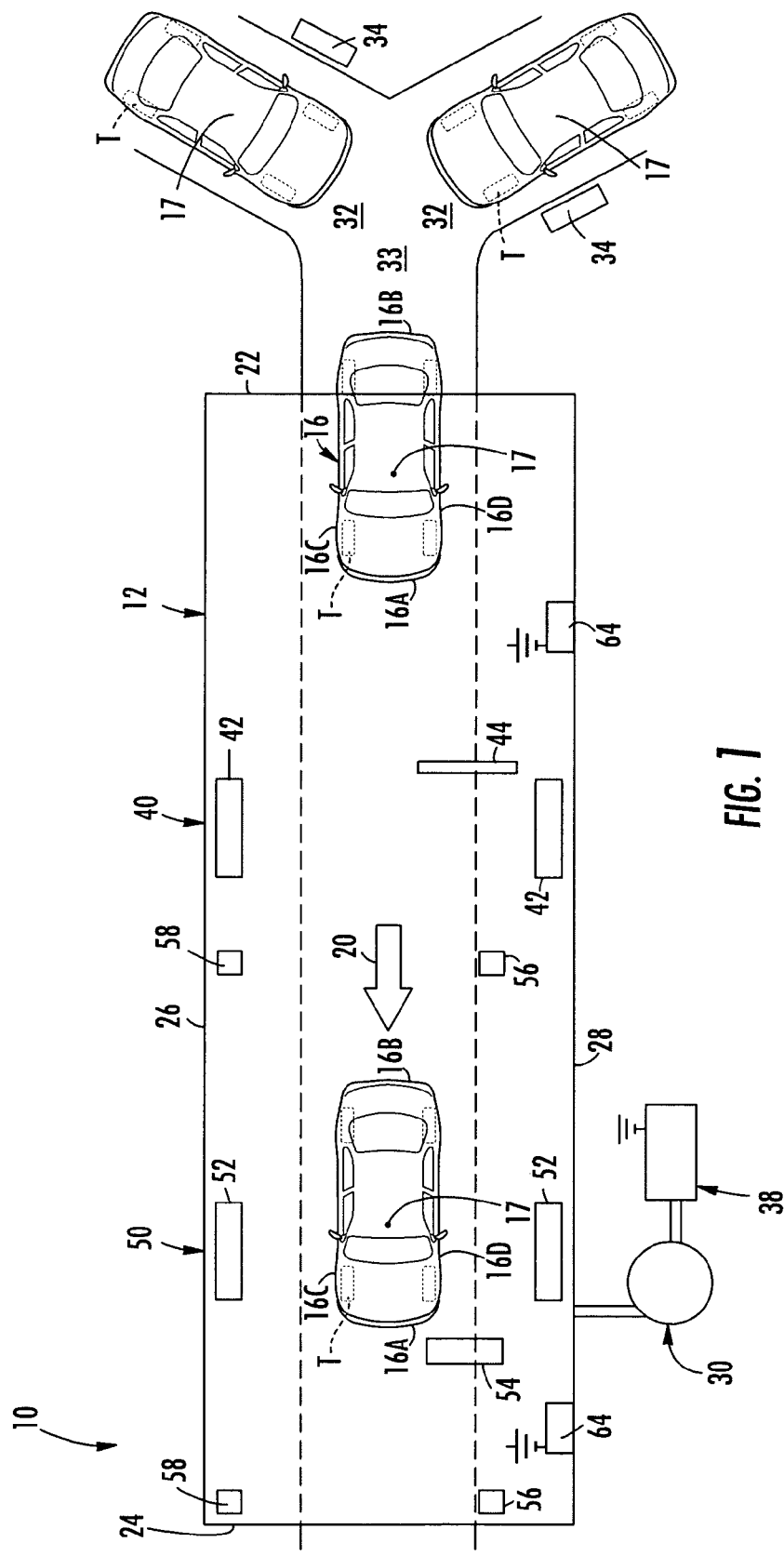
Figure 2:
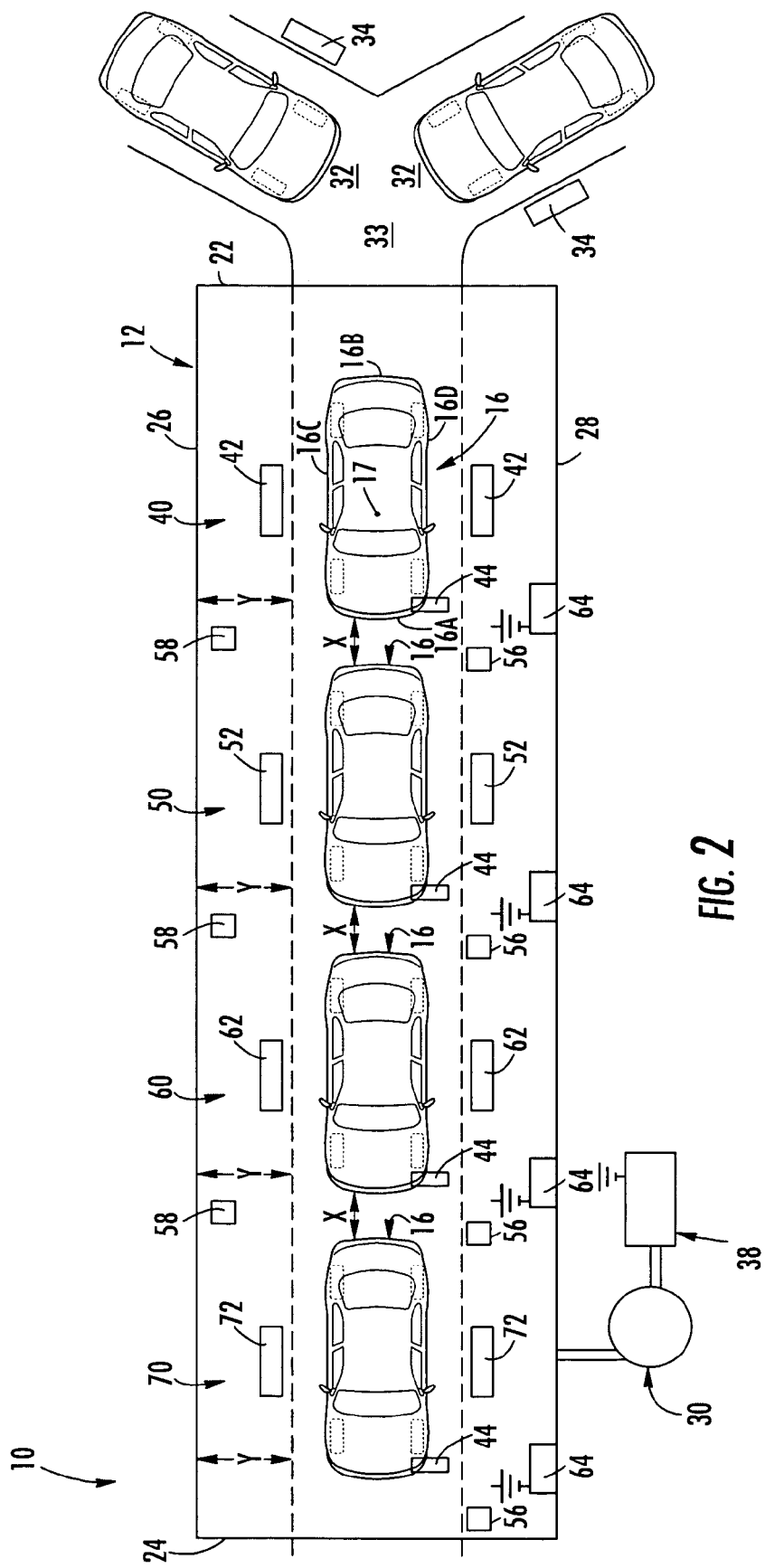
Figure 3:
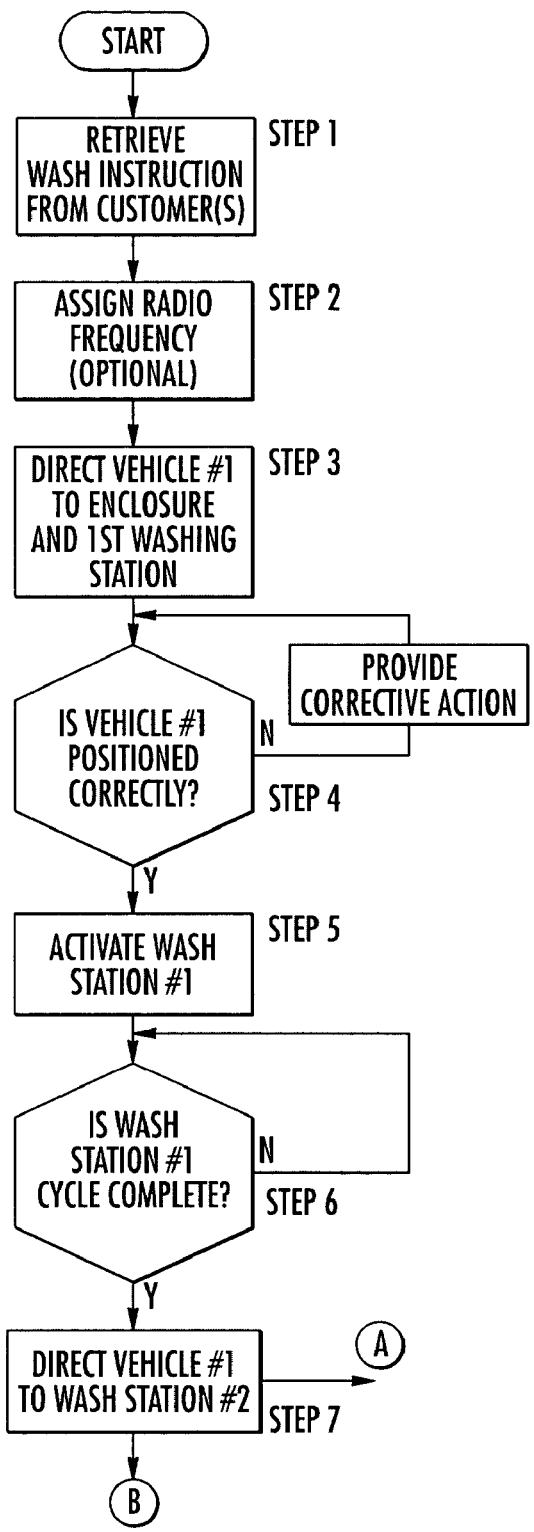
Figure 4:
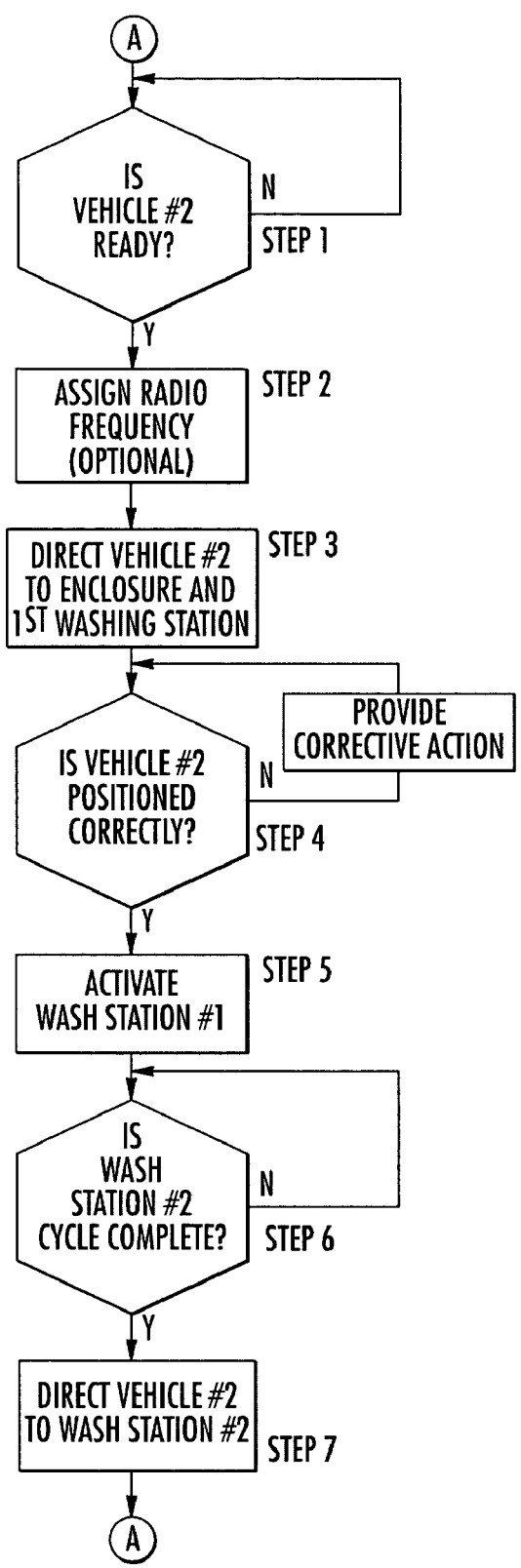
Figure 5:
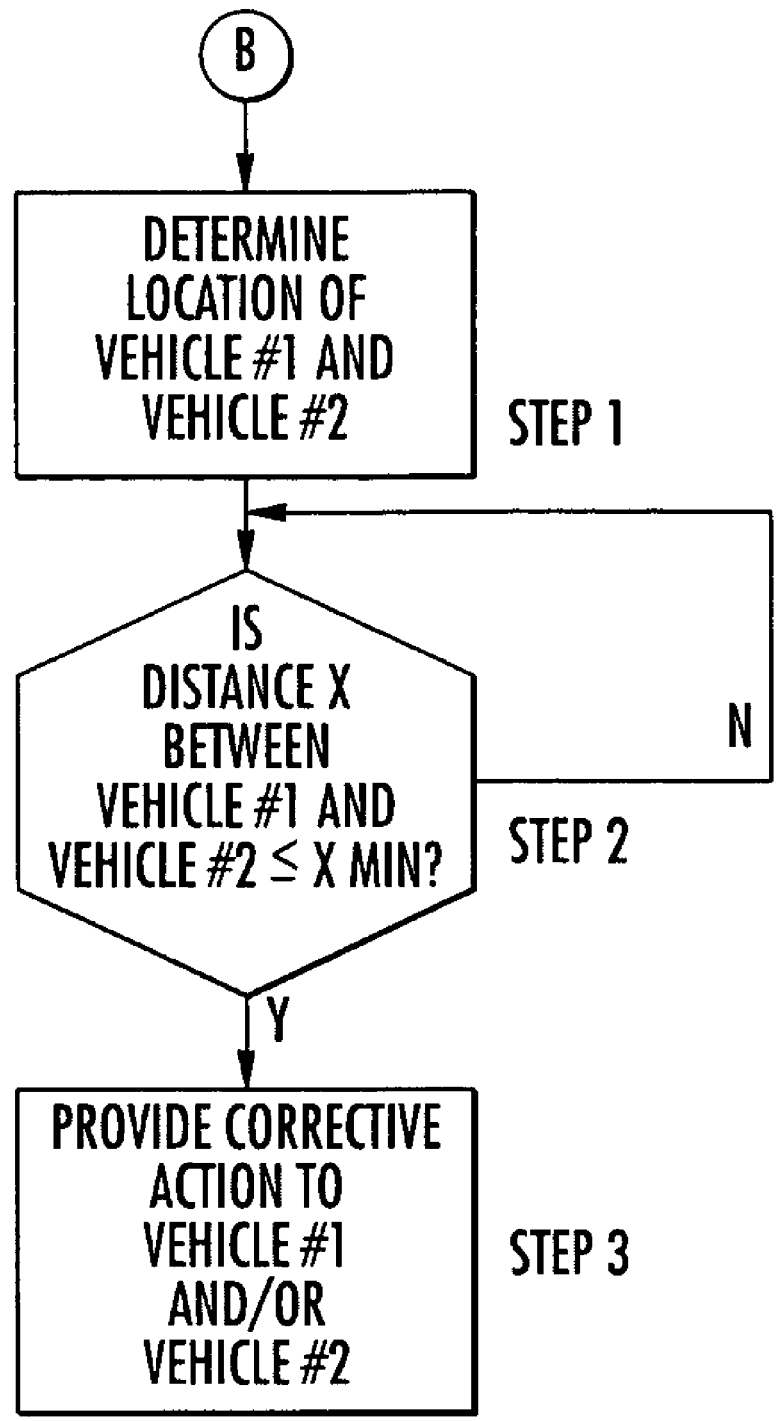

Having thus described the invention in general terms, reference will now be made to the accompanying drawings, which are not necessarily drawn to scale, and wherein:

FIG. 1 is a schematic plan view of a car wash system according to one embodiment of the present invention;

FIG. 2 is a schematic plan view of an alternative arrangement of a car wash system according to the present invention;

FIG. 3 is a flow diagram describing a method of processing at least one vehicle through an automatic car wash according to one embodiment of the present invention;

FIG. 4 is a flow diagram describing a method of processing at least one vehicle through an automatic car wash according to one embodiment of the present invention; and FIG. 5 is a flow diagram describing a method of detecting at least two vehicles being processed through an automatic car wash according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows a car wash system 10 according to one embodiment of the present invention. The system 10 includes a tunnel or enclosure 12 having entrance 22, exit 24, and sidewalls 26, 28. The enclosure 12 defines an elongate path of travel 20 for one or more vehicles 16 to travel upon. In one embodiment, the elongate path of travel 20 extends at least 20 feet, although the actual length may be more or less as desired. The elongate path of travel 20 preferably is at least as long as the length of the enclosure 12, although the elongate path may extend beyond the entrance 22 and/or exit 24 thereof. Each vehicle has a front end 16A, rear end 16B, sides 16C and 16D, and tires T. Each vehicle also preferably includes a conventional radio 17, which includes conventional items such as speakers and a tuner for receiving radio transmissions or signals as is known in the art. According to one embodiment, the vehicles 16 travel along the path of travel 20 under their own power, i.e., no conveyor devices are employed to move or carry the vehicles through the enclosure 12. However, in some embodiments it is contemplated that conveyors and the like may be used to help move the vehicles 16 through at least a portion of the enclosure 12. The vehicles approach the entrance 22 of the enclosure 12 via feed channels 32 that converge into a common entrance channel 33. While only two feed channels 32 are shown, it is possible to include more or fewer feed channels as desired. Each feed channel 32 includes an entry processor 34 that is designed to query the customer/driver of the vehicle 16, as well as receive responses from the customer and distribute information to the customer, as discussed more fully below. For simplicity, it is assumed that the customer/patron/driver is the same person, although this is not required.

The system 10 includes one or more carwash stations, such as a first car wash station 40 and a second car wash station 50. The car wash stations are located at least partially inside the enclosure 12 and include respective station devices 42 and 52, which are shown generically but can be one of many conventional car wash devices. The particular car wash device used is determined by the particular need of the system 10, but representative car wash devices include a wheel/tire washing station, dryer, rotating brush, presoak station, prerinse station, wax applicator, rinsing device, soap dispenser, sprayer assembly capable of directing a pressurized and/or high velocity fluid, and combinations and assemblies thereof. It should be noted that the term fluid is defined as encompassing liquid or gases, and the sprayer assembly may include a sprayer, fan, and/or other devices used to propel fluid. The positioning of the car wash devices 42 and 52 may also vary according to the particular system, but are shown for simplicity adjacent the sidewalls 26 and 28.

Each car wash station 40, 50 may also include a respective detector 44, 54 that senses the presence of a vehicle 16. In one embodiment, the detector is a wheel detector that is known in the art, such as the trip plate shown and described in U.S. Pat. No. 5,255,695. The wheel detectors 44, 54 provide feedback to the driver of the vehicle to help position the vehicle correctly with respect to a particular wash station 40, 50. The detectors 44, 54 can also be designed to trigger other components of the system 10 to provide further information to the driver, as discussed more fully below. It should be noted that while a wheel detector is shown schematically, other types of detectors may be used alternatively or in conjunction with the wheel detectors. Other types of detectors include ultrasonic, pressure contact switches, magnetic sensors, laser, and photo eye detectors. The wheel detectors 44, 54 operate in a conventional manner, whereby the tire T of a vehicle 16 engages a detector that triggers a corresponding car wash station 40, 50. Detectors could be used to scan the vehicle to determine the size and shape. This information could be used to improve the wash provided by addressing hard to clean areas, avoiding areas that could be damaged, and assisting other timing and throughput calculations.

The system 10 also includes a control device 30. The control device 30 is preferably a processor and storage device, such as a personal computer, industrial computer, and/or server. The control device 30 can be located on site or in a remote location. The control device 30 is operatively connected to the car wash stations 40 and 50, as well as related components. One such related component is a communicator or indicator 54 that provides audio and/or visual information to the driver. Indicator 54 is a known component that is used in conventional car washes, although the indicator could be customized to convey particular information to the driver as desired. The control device 30 is also operatively connected to the entry processors 34 so that information can be conveyed to and from the driver and control device via the entry processor. For example, the entry processor may initially request a wash code, payment, or wash criteria/selection information from the driver. When such information is received from the driver, the information may be transferred to the control device 30 in order to set up the wash stations 40, 50 and other components of the system 10 for processing the vehicle 16. Information may also be transmitted from the control device 30 to the driver via the entry processor 34, or transmitted simply from the entry processor. This information may include, but is not limited to, safety instructions, driving directions, advertisements, offers, warnings, incentives, entertainment, news, music, and combinations thereof.

In one embodiment, the system 10 also includes a main radio transmitter 38 that is operatively connected to the control device 30 and is designed to transmit radio signals or transmissions over a relatively short distance, such as around 300 feet, although the transmission distance may be more or less as desired. The main radio transmitter 38 is preferably a low power FM transmitter that is capable of transmitting information over one or more selectable radio frequencies. The information is selected by the control device 30 and preferably includes, but is not limited to, driving directions and corrective actions, warnings, safety information and instructions, advertisements, offers, incentives, entertainment, news, music, and combinations thereof. In one embodiment, specific information can be directed to a particular customer, whereby wash history and other information can be used to tailor the current wash to that particular customer, including but not limited to addressing the customer by name, reminding the customer of prior wash selections, and selecting special offers for the customer. Such customization could be offered under a membership structure or the like to further enhance customer satisfaction and repeat visits. In order for the information to be received by the driver of a particular vehicle engaging the car wash system 10, the driver preferably tunes the radio 17 of the vehicle 16 to a predetermined frequency, and the control device 30 transmits specific information to the vehicle via the transmitter 38.

In one embodiment, the control device 30 assigns a specific radio frequency for each vehicle 16 being processed through the car wash. The specific radio frequency is conveyed to the driver via the entry processor, either visual or audibly. Once the radio 17 inside the vehicle 16 is set to the specific radio frequency, the control device 30 can monitor the progress of the vehicle 16 along the path of travel and transmit specific information to the driver via one or more devices, including the transmitter 38. It should be noted that the "radio" discussed herein is described as being in the vehicle 16, which includes all types of radios including the conventional "car radio" as well as personal stereos, boom boxes, and other known radio receivers. Customers without a radio or with a sectional, retractable antenna could purchase or otherwise obtain a small FM radio from the entry system via a specialized dispenser (not shown). More specifically, sectional antennas can be damaged by friction and hybrid car washing equipment, so in order to avoid such damage, customers would be asked to purchase an FM radio, select the desired setting, and then turn off their car radio and retract the sectional antenna either automatically or manually if applicable.

In an alternative embodiment, the control device 30 and main radio transmitter 38 are arranged to transmit specific information over several station radio transmitters 64 that are spaced along the path of travel 20. The radio transmitters 64 are designed or arranged to transmit specific information over a very short distance, such as no more that about 10 feet. In this manner, the vehicles 16 can all tune their radios 17 to a common radio frequency, and the control device 30 and main radio transmitter 38 send specific information to a particular station radio transmitter 64 depending on the situation. The methods for sending radio transmissions from the main radio transmitter 38 to the station radio transmitters 64 is well known in the art, and therefore is not discussed in further detail. The radio transmissions can be augmented by also conveying information to the driver via a communications device, such as audio/visual indicator 56, as desired. It is also possible to transmit radio messages, such as instructions, advertisements, and other information, to customers while they wait to enter the enclosure 12. As such, the customer can be informed regarding the system features, such as wash selections, payment options, and the like, thus reducing delay and increasing throughput.

In one embodiment, the system 10 also includes at least one proximity device 58 that determines the distance X between two adjacent vehicles 16. The proximity device 58, while represented in the figures schematically, can be one of many types of devices that are known in the art, such as ultra-sonic or photo eye detectors, and can include various other parts and arrangements depending on the system. The proximity device 58 is operatively connected to the control device 30 and can be used alone or in conjunction with the detectors 44 and 54 to determine the location of each vehicle 16 and the relative distance X between the vehicles within the enclosure 12, i.e., when the vehicles are being processed by the car wash.

As shown in FIG. 1, two vehicles 16 are present in the feed channels 32, one vehicle is present at the entrance 22 of the enclosure 12 proximate the first car wash station 40, and one car is proximate the second car wash station 50. As shown, the vehicles near the car wash stations 40 and 50 have not yet engaged the corresponding detectors 44 and 54. According to one embodiment, as each vehicle engages the corresponding detector, the car wash station is activated. Alternatively, a particular car wash station may be activated as a vehicle moves along the path of travel. For example, a foam applicator may be present adjacent the first car wash station and is activated as the vehicle exits the first car station so that foam is applied to the vehicle as the vehicle passes, such as to the second car wash station. Advantageously, the system 10 allows for more than one vehicle 16 to be processed simultaneously or concurrently, and the drivers are instructed and required to drive the vehicles through the enclosure under the vehicle's own power from one car wash station to the next.

FIG. 2 shows an alternative arrangement of the present system 10 whereby the enclosure 12 houses four car wash stations 40, 50, 60, and 70, each including a respective car wash device 42, 52, 62, and 72, which may employ or include any conventional car wash assembly, including but not limited to a brush assembly, a spray assembly, and a dryer assembly. As shown, each wash station has a corresponding detector 44 and audio/visual indicator, although these may be optional depending on the system. FIG. 2 also shows a plurality of proximity devices 58 that measure the distance X between two adjacent vehicles 16, and may also measure a distance Y defined as the lateral distance between a vehicle and a fixed lateral point, such as the sidewall 26. As mentioned above, the proximity devices 58 are shown generically and may employ many component parts and rely on other systems to read and determine the values X and Y.

The proximity devices 58 are also preferably connected to the control device 30 so that feedback, instructions, and other information can be passed along to the driver. It should also be noted that the proximity devices 58 may be used as alternatives to or in conjunction with the detectors 44, 54, 64, and 74 (if present) if the proximity devices are configured to locate the vehicles along the path of travel 20, particularly with respect to the car wash stations 40, 50, 60, and 70.

FIGS. 3-5 illustrate various methods according to the present invention. FIG. 3 illustrates one method of processing a plurality of vehicles through an automatic car wash. Step 1 includes receiving wash instructions from a customer or driver that may include selections relating to the type of wash desired, such as touch-free or friction, and other instructions relating to the desired wash. Step 2 includes assigning a radio frequency to the first vehicle 16 and conveying the assigned frequency to the driver via the entry processor or other indicator. Step 3 includes directing the first vehicle to the enclosure 12 and to the first car wash station 40 via radio transmissions, visual cues, and/or audible cues. Other stations may precede the first car wash station 40, particularly a pre-wash station or wheel cleaner station that are common on most automatic car washes.

As shown in Step 4, if the first vehicle is positioned correctly, e.g., the proximity device 58 and/or the detector 44 determine that the vehicle is generally aligned along the path of travel 20, and the distance Y between the vehicle and the sidewall 26 is within an acceptable range or above a minimum value, then the first car wash station 40 is activated (Step 5). If the first vehicle 16 is not positioned correctly, corrective action is provided in the form of instructions to the driver via radio transmission or indicators presented by the audio/visual indicator 56. For example, if the driver of the first vehicle 16 enters the enclosure 12 at an angle and subsequently misses the detector 44 or is detected by the proximity device 58 to be outside the acceptable range, the control device 30 sends an appropriate corrective action to the driver, such as "turn the wheel to the right" or "straighten your vehicle" or a similar instruction. Once the first station 40 has completed its cycle (Step 6), the first vehicle 16 is directed to the second car wash station 50 (Step 7).

Turning to FIG. 4, if a second vehicle 16 is ready to enter the enclosure 12 (Step 1), i.e., the customer/driver has input the desired wash characteristics, made payment, and the like, then a radio frequency may be assigned to the vehicle (Step 2). As discussed above, the radio frequency may be a unique frequency assigned only to the second vehicle, or the radio frequency may be a common frequency that is shared by all the vehicles. In the former case, the control device 30 determines particular information that is transmitted to each vehicle via the unique frequency assigned thereto. In the latter case, the control device 30 sends particular information to each of the station radio transmitters 64, which transmit the information to the driver via radio transmission over the short distance as defined herein. In addition, the entry processors 34 may also be able to transmit information to the drivers and vehicles via radio signals or transmissions. As such, the control device can begin sending instructions and other information, such as advertisements, incentives, and the like, before the vehicle has even entered the enclosure 12.

Pursuant to Step 3, the second vehicle 16 is directed to the first station 40 and positioned correctly pursuant to Step 4 as described above for the first vehicle. Steps 5-7 also follow a similar flow as described above for the first vehicle, whereby at the completion of the first car wash station 40, the second vehicle 16 is directed toward the second car wash station 50. In one embodiment, the control device 30 directs concurrent stop instructions to at least two vehicles along the elongate path. Such action is not part of a normal conveyor car wash system, which maintains a constant velocity of the vehicles being washed. As shown in FIGS. 2 and 4, the process can be repeated continuously, whereby the next available vehicles, such as a third vehicle 16 and a fourth vehicle 16, can be processed through the system 10. The control device is capable of monitoring the progress of each vehicle and taking corrective action according to predetermined rules, formulas, and/or actions. Accordingly, a plurality of vehicles can be processed simultaneously and concurrently, thereby greatly increasing throughput of the system compared to conventional rollover or "in-bay" car washes. Advantageously, the system 10 avoids the use of conveyors for moving the vehicles 16 along the path of travel 20, and thereby providing a safer and less complex wash system without sacrificing throughput or quality.

FIG. 5 illustrates the function of the proximity devices 58 that may be present along the enclosure 12 or path of travel 20. In particular, the proximity devices 58 may be designed to detect not only the positioning of each vehicle 16 within the enclosure 12 or along the path of travel 20, but also the positioning of each vehicle with respect to adjacent vehicles. As shown in FIG. 5, Step 1 includes determining the location of the first and second vehicle 16, but can also include determining the location of any vehicle that is being processed by the system 10. The location of each vehicle 16 can be determined by any number of conventional devices and methods, including magnetic, laser, ultrasonic, radio frequency, photo eye, contact members, and the like. The location of each vehicle is preferably determined on approximately the same position on each vehicle, such as an edge of the front end 16A of the vehicle 16. In addition, the location of each vehicle also includes the position of the rear of the vehicle, such as an edge of the rear end 16B. As such, the distance X between the rear of one vehicle and the front of the upstream vehicle can be determined. The frequency for determining the location of each vehicle 16 can vary depending on the system 10, but in one embodiment the location of each vehicle is determined approximately every 0.3 seconds. It should also be noted that various other conventional devices may be employed for determining the length and/or location of each vehicle.

FIG. 5 also includes a process step for determining whether the distance X between two adjacent vehicles 16 is greater or equal to XMIN, which is defined as the minimum distance allowed between the vehicles (Step 2). If the distance X between any two vehicles becomes lower than XMIN, corrective action is sent from the control device 30 to one or more of the drivers and vehicles 16 via the main radio transmitter 38, station radio transmitters 64, and/or audio/visual indicators 56 (Step 3). Such corrective action may include one or more warnings and driving directions, such as "speed up," "slow down," "stop," "wait," and "proceed." The driver can then take corrective steps to restore the minimum distance XMIN. As such, throughput and efficiency are maximized without compromising safety. In addition, the wash process time at each station 40, 50, 60, and 70 is kept generally equal for each vehicle 16, thus ensuring a uniform and thorough wash that is pleasing to the customer. Accordingly, the system 10 is able to process a plurality of vehicles 16 simultaneously while maintaining a safe and effective distance between the vehicles. Advantageously, the vehicles 16 travel through the enclosure 12 under their own power, i.e., the driver of each vehicle uses the vehicle's own motor and other control systems to guide the vehicle along the path of travel. As such, the system 10 of the present invention avoids the disadvantages of conveyor type car wash system while providing excellent vehicle throughput and quality in a format that is easy to understand by the customer.

The present system can also be applied to other types of conveyor or conveyor-like car wash systems that have not been previously described, yet suffer from similar disadvantages. One such carwash system employs guard rails that help guide one or more vehicles along a straight line, but requires the vehicles to be driven under their own power instead of utilizing a conveyor. Such a carwash system is typically employed by auto auction houses, rental car agencies, and valet services. The disadvantage of this type of carwash system is that it requires a constant, optimum vehicle speed for best washing results. This can be difficult, as driving a vehicle through a "wall" of water or moving cloth can be intimidating and distracting to the driver, particularly if other vehicles are known to be near the vehicle, but cannot be seen due to soap and water blocking the drivers' view.

Advantageously, the present system can help maintain the speed of each vehicle and proximate location to other vehicles using radio transmissions as described herein, thereby maximizing the efficiency and quality of the wash process, and reducing the possibility of accident or collision. In addition, a guard rail carwash system utilizing the teachings of the present invention provides comfort and direction to the drivers, which allows the customer to enjoy the wash process instead of maintaining a high level of concentration driving the vehicle and avoiding other vehicles.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. For example, the term "car wash" is a generic term that is equivalent to a "vehicle wash" that includes cars, trucks, SUVs, and the like.

That which is claimed:

1. An automatic car wash system designed to process multiple vehicles simultaneously, the system comprising:
    an elongate path extending at least 20 feet;
    a plurality of stations spaced along the elongate path, at least one of the plurality of stations including a spray assembly operable to direct a pressurized and/or high velocity fluid onto a vehicle at the station;
    a control device operatively connected to the plurality of stations;
    at least two detectors spaced along the elongate path and operatively connected to the control device, the at least two detectors designed to indicate the presence of at least one of the multiple vehicles to the control device;
    at least one proximity device operatively connected to the control device for detecting a relative distance between a rear of one of the vehicles and a front of another of the vehicles; and
    a radio transmitter operatively connected to the control device, the radio transmitter operable to transmit information to the multiple vehicles via radio signals.

2. An automatic car wash system according to claim 1, wherein the plurality of stations further include at least one device selected from the group consisting of a wheel washing station, a dryer, a rotating brush, a wax applicator, and a rinsing device.

3. An automatic car wash system according to claim 1, wherein at least one of the at least two detectors is a detector selected from the group consisting of pressure switch, contact switch, magnetic, photo eye, laser, and ultrasonic.

4. An automatic car wash system according to claim 1, further comprising a visual and/or audible communicator for conveying information to at least one driver of the vehicles.

5. An automatic car wash system according to claim 1, wherein the control device is operable to assign a unique radio frequency to each of the multiple vehicles and direct specific information to each vehicle via the radio transmitter.

6. An automatic car wash system according to claim 1, wherein the radio transmitter is operable to transmit information over a plurality of radio frequencies.

7. An automatic car wash system according to claim 1, further comprising a plurality of station radio transmitters spaced along the elongate path that operate on a common frequency and are arranged to transmit information over a distance of no more than about 10 feet, wherein the control device is operable to direct specific information to each of the station radio transmitters so that the specific information can be directed to a particular vehicle depending on the location of the vehicle along the path of travel.

8. An automatic car wash system according to claim 1, wherein the radio transmitter is operable to transmit information selected from the group consisting of instructions, warnings, advertisements, offers, incentives, entertainment, news, music, and combinations thereof.

9. An automatic car wash system according to claim 1, wherein the control device is operable to control a predetermined throughput of vehicles traveling through the system by directing audible and visual driving instructions at the vehicles.

10. An automatic car wash system designed to concurrently process a plurality of vehicles including at least a first vehicle and a second vehicle, the system comprising:
an elongate path that defines a path of travel for the vehicles traveling along the path under their own power;
a first station positioned along the elongate path, the first station including a detector for detecting the presence of the first vehicle, and further including a spray assembly operable to direct pressurized and/or high velocity fluid against the first vehicle that is in a stationary position;
a second station positioned downstream of the first station along the path of travel, the second station including a detector for detecting the presence of the second vehicle, and further including at least one assembly selected from the group consisting of a brush assembly, a spray assembly, and a dryer assembly;
a control device operable to direct instructions to a driver of the first vehicle to proceed from the stationary position at the first station towards the second station;
at least one proximity device operatively connected to the control device for detecting the relative distance between a rear of one of the vehicles and a front of another of the vehicles; and
a communication device operatively connected to the control device for providing information to a driver of at least one of the vehicles regarding the relative distance therebetween.

11. An automatic car wash system according to claim 10, further comprising a third station positioned along the elongate path, the third station including a detector for detecting the presence of a third vehicle, and further including at least one assembly selected from the group consisting of a brush assembly, a spray assembly, and a dryer assembly.

12. An automatic car wash system according to claim 10, further comprising a fourth station positioned along the elongate path, the fourth station including a detector for detecting the presence of a fourth vehicle, and further including at least one assembly selected from the group consisting of a brush assembly, a spray assembly, and a dryer assembly.

13. An automatic car wash system according to claim 10, wherein the control device is operable to direct concurrent stop instructions to at least two vehicles along the elongate path.

14. An automatic car wash system according to claim 10, further comprising a multiple-channel entrance designed to direct vehicles from at least two feed channels into a common entrance channel.

15. An automatic car wash system according to claim 10, wherein at least one of the at least two detectors is a detector selected from the group consisting of pressure switch, contact switch, magnetic, photo eye, laser, and ultrasonic.

16. An automatic car wash system according to claim 10, wherein at least one of the stations includes a rotating brush, and wherein the system is selectable to engage the rotating brush against a vehicle.

17. An automatic car wash system designed to process multiple vehicles simultaneously, the system comprising:
an elongate path extending at least 20 feet;
a plurality of stations spaced along the elongate path, at least one of the plurality of stations including a spray assembly operable to direct a pressurized and/or high velocity fluid onto a vehicle at the station;
a control device operatively connected to the plurality of stations;
at least two detectors spaced along the elongate path and operatively connected to the control device, the at least two detectors designed to indicate the presence of at least one of the multiple vehicles to the control device;
at least one proximity device operatively connected to the control device for detecting a relative distance between multiple vehicles; and a radio transmitter operatively connected to the control device, the radio transmitter operable to transmit information to the multiple vehicles via radio signals,
wherein the control device is operable to assign a unique radio frequency to each of the multiple vehicles and direct different information to each vehicle via the radio transmitter.

18. An automatic car wash system according to claim 17, wherein the plurality of stations further include at least one device selected from the group consisting of a wheel washing station, a dryer, a rotating brush, a wax applicator, and a rinsing device.

19. An automatic car wash system according to claim 17, wherein at least one of the at least two detectors is a detector selected from the group consisting of pressure switch, contact switch, magnetic, photo eye, laser, and ultrasonic.

20. An automatic car wash system according to claim 17, further comprising a visual and/or audible communicator for conveying information to at least one driver of the vehicles.

21. An automatic car wash system according to claim 17, wherein the radio transmitter is operable to transmit information over a plurality of radio frequencies.

22. An automatic car wash system according to claim 17, wherein the radio transmitter is operable to transmit information selected from the group consisting of instructions, warnings, advertisements, offers, incentives, entertainment, news, music, and combinations thereof.

23. An automatic car wash system according to claim 17, wherein the control device is operable to control a predetermined throughput of vehicles traveling through the system by directing audible and visual driving instructions at the vehicles.

24. An automatic car wash system designed to process multiple vehicles simultaneously, the system comprising:
   an elongate path extending at least 20 feet;
   a plurality of stations spaced along the elongate path, at least one of the plurality of stations including a spray assembly operable to direct a pressurized and/or high velocity fluid onto a vehicle at the station;
   a control device operatively connected to the plurality of stations;
   at least two detectors spaced along the elongate path and operatively connected to the control device, the at least two detectors designed to indicate the presence of at least one of the multiple vehicles to the control device;
   at least one proximity device operatively connected to the control device for detecting a relative distance between multiple vehicles; and
   a plurality of radio transmitters spaced along the elongate path that operate on a common frequency and arranged to transmit information over a distance of no more than about 10 feet to the multiple vehicles via radio signals, wherein the control device is operable to direct specific information to each of the radio transmitters so that the specific information can be directed to a particular vehicle depending on the location of the vehicle along the path of travel.

25. An automatic car wash system according to claim 24, wherein the plurality of stations further include at least one device selected from the group consisting of a wheel washing station, a dryer, a rotating brush, a wax applicator, and a rinsing device.

26. An automatic car wash system according to claim 24, wherein at least one of the at least two detectors is a detector selected from the group consisting of pressure switch, contact switch, magnetic, photo eye, laser, and ultrasonic.

27. An automatic car wash system according to claim 24, further comprising a visual and/or audible communicator for conveying information to at least one driver of the vehicles.

28. An automatic car wash system according to claim 24, wherein the radio transmitters are operable to transmit information selected from the group consisting of instructions, warnings, advertisements, offers, incentives, entertainment, news, music, and combinations thereof.

29. An automatic car wash system according to claim 24, wherein the control device is operable to control a predetermined throughput of vehicles traveling through the system by directing audible and visual driving instructions at the vehicles.

\* \* \* \* \*